2,839,277
MEANS FOR DESTABILIZING CREAM

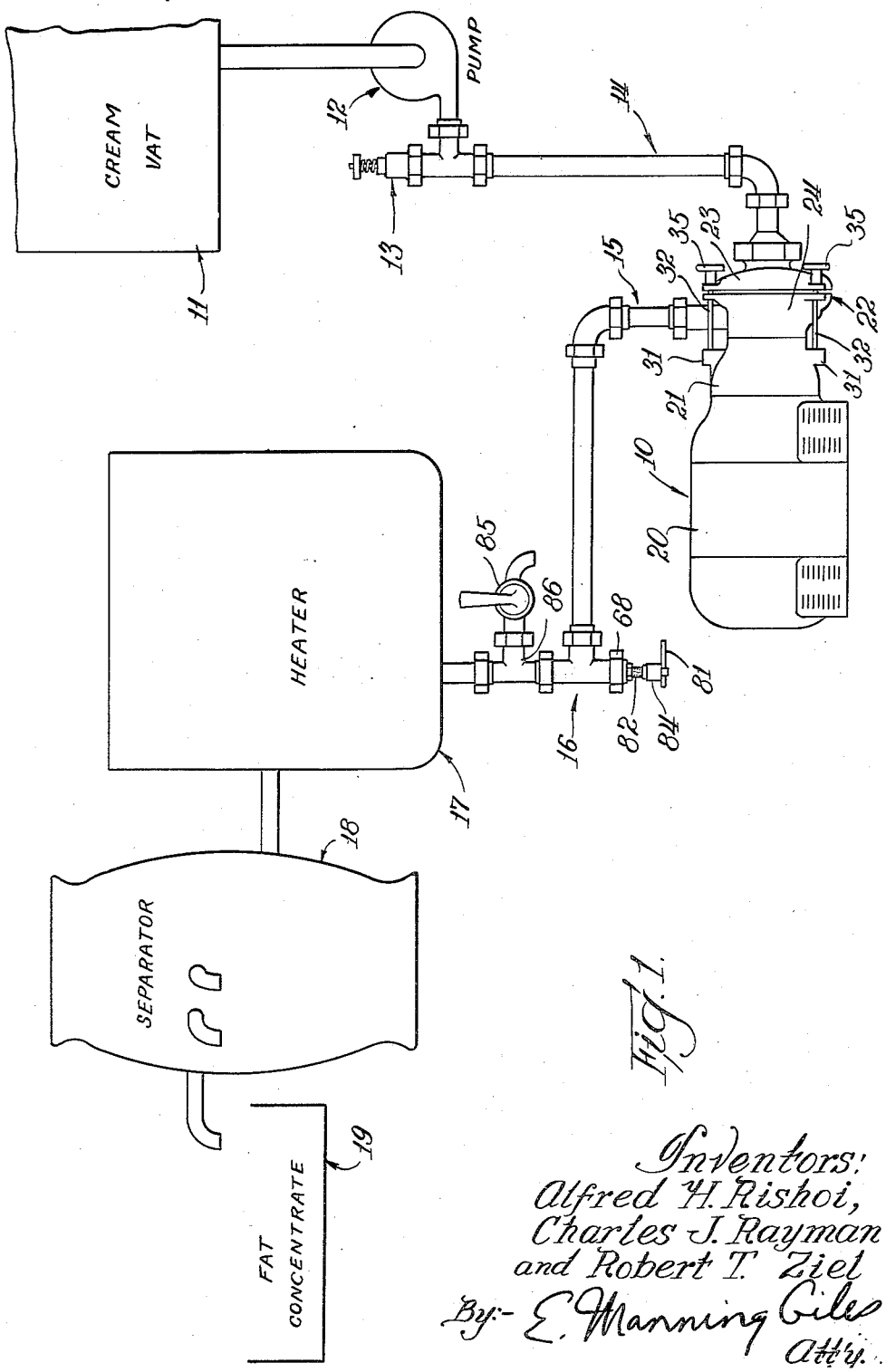

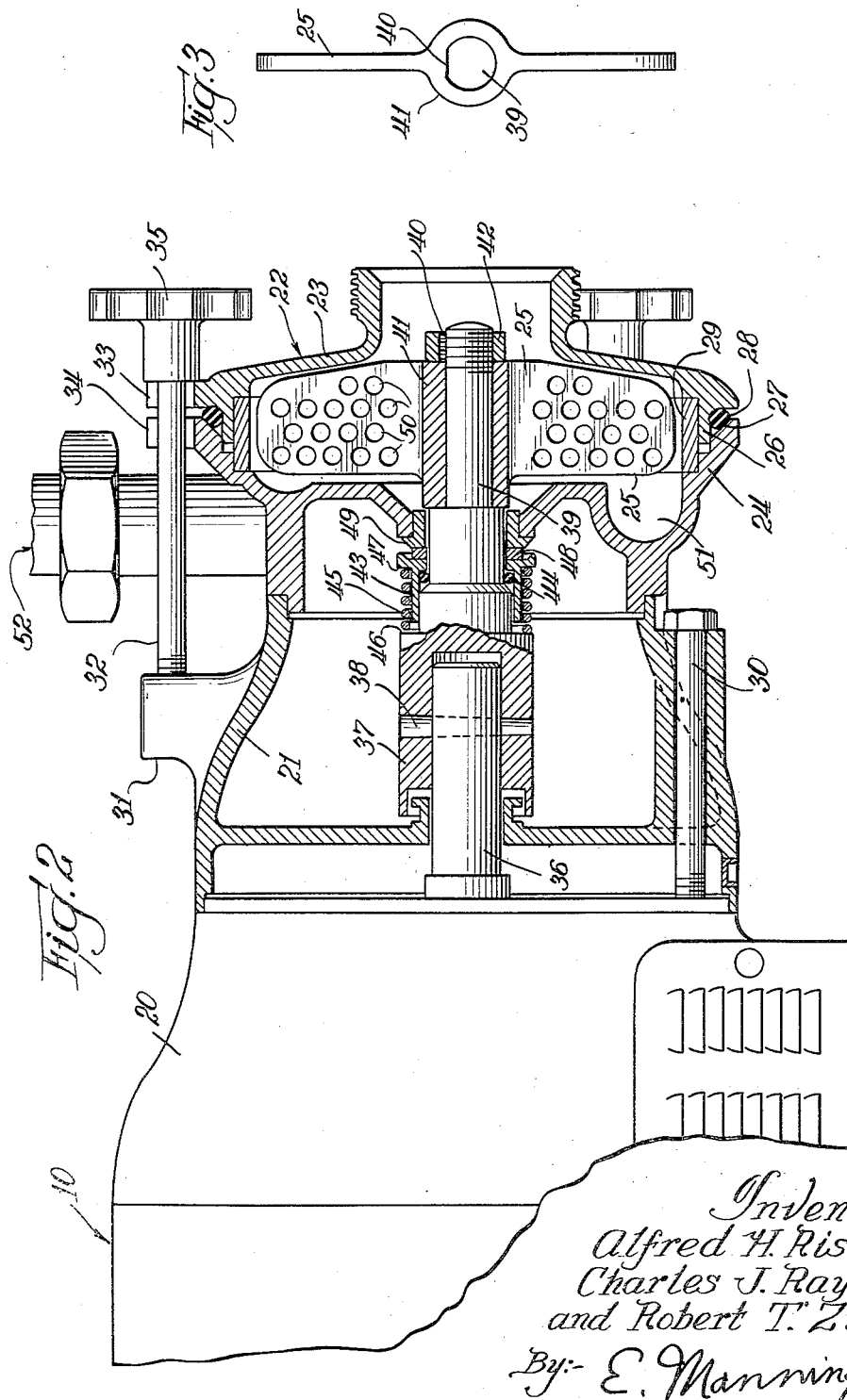

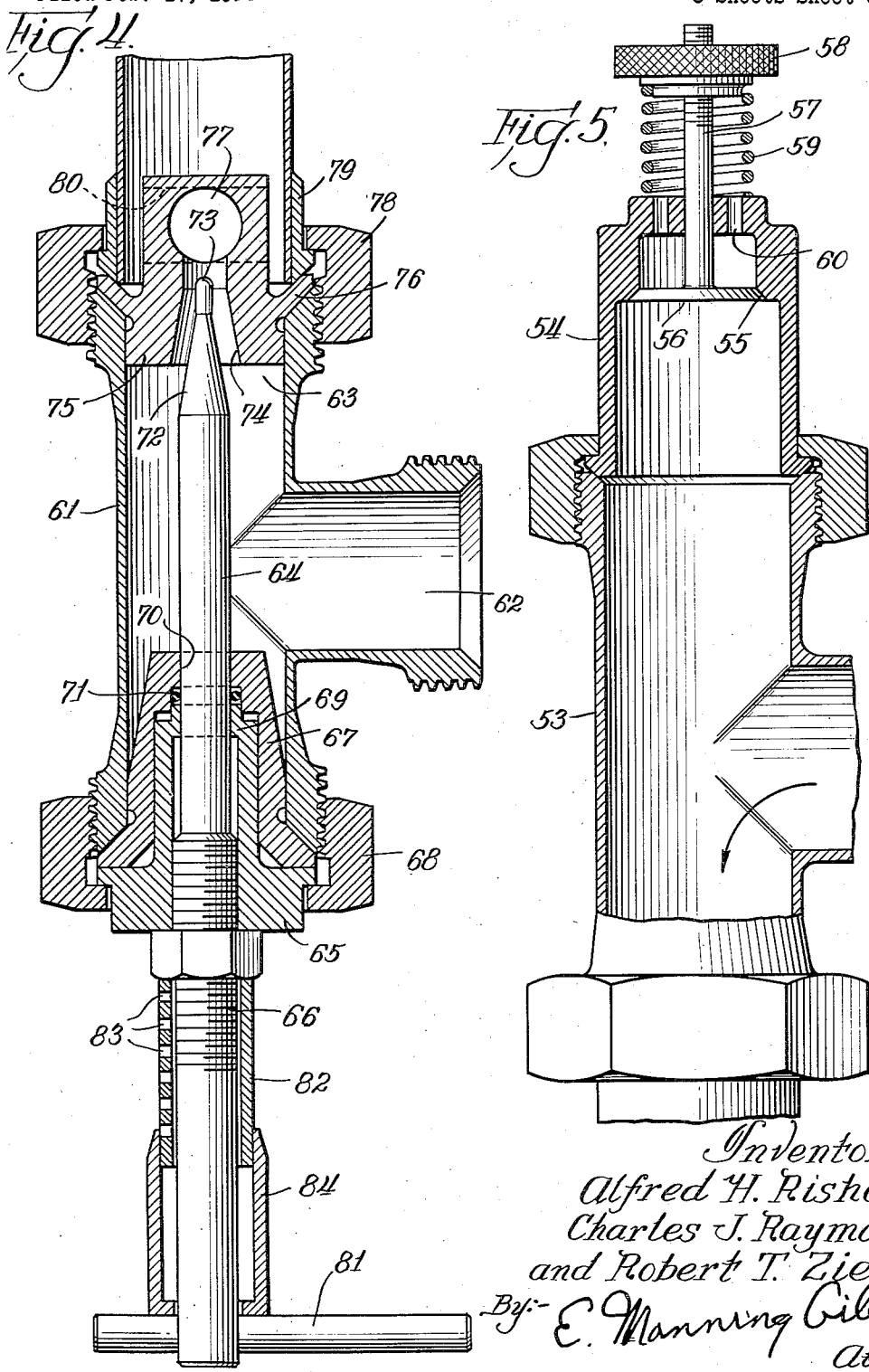

Alfred H. Rishoi, Evanston, Ill., Charles J. Rayman, Cedar Rapids, Iowa, and Robert T. Ziel, Chicago, Ill., assignors to Cherry-Burrell Corporation, Chicago, Ill., a corporation of Delaware Application February 17, 1954, Serial No. 410,976

1 Claim. (Cl. 259—9)

Our invention relates to a device for destabilizing emulsions such as cream, and has reference more particularly to a system for agitating emulsions of fat dispersed in a non-fat medium, such as cream, to cause the emulsion to become unstable and thus to facilitate separation of the fat fraction out of the non-fat medium in which it is normally suspended.

In the past, butter was made commercially by the batch method in churns. A predetermined quantity of cream was placed in a somewhat cylindrical container or churn provided with suitable interior baffles and the churn was then rotated. The initial result of the churning was to produce a foam and the fat globules tended to adhere to the foam bubbles. Further churning tended to break the membranes or hulls in which the fat globules are enclosed. Then, as the churn continued to rotate and the cream was agitated further, the milk fat globules tended to coalesce or cling together so as to form granules, and finally the granules merged to form a mass of butter.

The butter industry is now switching to the manufacture of butter by the continuous method such as is disclosed in the following patents: No. 2,423,834 dated July 15, 1947, No. 2,466,894 and No. 2,466,895 dated April 12, 1949, and No. 2,630,388 dated March 3, 1953, to Horneman et al., and No. 2,407,612 dated September 10, 1946, and No. 2,630,059 dated March 3, 1953, to Lundal et al.

In the method as disclosed in these patents, the cream is first destabilized to weaken or break up the milk fat globules and heated to above the melting temperature of milk fat. The thus destabilized and heated emulsion is then passed to a separator where the milk fat is removed from the skim milk providing a separation product of concentrated milk fat hereinafter referred to as fat concentrate. The fat concentrate is then pasteurized, and following pasteurization the usual butter additives such as salt, water, and flavor, are combined with the fat concentrate in predetermined proportions. Thereafter the blend of fat concentrate, water, salt, and flavor are chilled and agitated simultaneously followed by extrusion through an orifice tube to produce butter.

In the early embodiments of the continuous butter system, the destabilization was accomplished by the use of a vacuum pasteurizer of the type described in Patent No. 2,022,420. The direct action of steam on cream in a low pressure atmosphere provided the agitation necessary to destabilize the emulsion. Simultaneously the steam provided the heat necessary to liquefy the milk fat to place it in condition for separation. It was found, however, that while this apparatus was generally effective in destabilizing cream for continuous butter-making, the fat losses were somewhat high and a more efficient destabilizing device was desired.

Later in the development of the continuous butter-making system, a substantially cylindrical, jacketed heat exchange device was used for destabilizing and heating the cream. The device, which was of the type disclosed in Patent No. 2,278,340, was provided with an axial agitator member which was rotated at sufficient speed to disrupt the cream emulsion. As an alternative, a vat with a rotary agitator therein could be used.

While all of these various devices were capable of destabilizing cream for the purposes of the continuous butter system, and other types of apparatus could be used for disrupting milk fat globule structure, none had the effect of destabilizing the cream with sufficient uniformity to insure maximum recovery of milk fat from the destabilized cream in the separation stage.

It is necessary to control the agitation of the cream in the manufacture of butter by the continuous method so as to insure the correct degree of destabilization. If the cream is but partially destabilized, some of the milk fat may be retained with the skim during separation with consequent loss of such fat. Conversely, excessive agitation of the cream may cause excessive coalescing of fat particles and it is desirable that this be avoided. And since the amount of agitation required for destabilization depends in part upon the age of the cream, it is important that the destabilizing facilities be adjustable to control the amount of agitation.

It is the principal object of our invention to provide destabilizing means for use in the manufacture of butter by the continuous method wherein the cream treated therein is efficiently destabilized so as to assure extraction of virtually the entire fat content of the cream and thus to avoid fat losses during separation.

It is another object of our invention to provide destabilizing means which are dependable and trouble-free and can be operated continuously over long periods of time without interruption and without special servicing.

It is a further object of our invention to devise a system of destabilization which is susceptible of control, and to design means which permit adjustable control of the degree of destabilization of cream and of the amount of air incorporated therein.

And it is a still further object of our invention to provide destabilizing equipment which is low in cost, economical to operate, and of sanitary design for convenient cleaning, these and other objects being accomplished as hereinafter described, reference being had to the accompanying drawing in which—

Fig. 1 is a diagrammatic view showing a destabilizing unit embodying our invention as combined with other components in a continuous butter-making system;

Fig. 2 is a longitudinal sectional view of the destabilizing unit shown in Fig. 1;

Fig. 3 is an end view of the agitator member in the destabilizing unit;

Fig. 4 is a longitudinal sectional view of the control valve for said destabilizing unit; and Fig. 5 is a sectional view showing the air inlet used with said destabilizing unit.

Referring now to the drawing and particularly to Fig. 1, the destabilizing unit of our invention is designated generally by the reference numeral 10 and is shown in combination with other components of a continuous butter-making system.

In the illustrated system shown in Fig. 1, cream is supplied from a cream vat 11 to a pump 12. From the pump, the cream flows past an air inlet valve 13 and through an inflow duct 14 to the destabilizing unit 10. From the destabilizer 10, the destabilized cream passes through an outflow duct 15 to a control valve 16 and thence to a heater 17, which is preferably of the centrifugal type. The destabilized and heated cream flows from the heater 17 to a separator 18 and at this point the milk fat is separated from the skim milk. Preferably, the separator 18 is of the centrifugal, three-stage clarifying or desludging type, although in the manufacture of butter from sweet cream, a plastic cream bowl may be used.

The concentrated milk fat is then accumulated in a vat 19 from which it is supplied to subsequent apparatus in the continuous butter-making system.

The destabilizer 10 consists of a motor housing 20, a housing extension 21, and a substantially circular, dished-out front section 23 and a corresponding back section 24, joined peripherally in face-to-face relation to provide an enclosure for an agitating blade 25. The front section 23 is provided with a peripheral seat 26 around the edge adjacent the back section 24, and the latter is provided with a circumferential, outwardly-flared seat 27. An O-ring gasket 28 of neoprene or other resilient material is interposed between the respective seats 26 and 27 and is compressed therebetween in liquid-sealing relation.

On their inner peripheries, each of the respective sections 23 and 24 is provided with a channel, the respective channels forming a circumferential recess within the casing to receive a spacer ring 29, to assure proper spacing of the respective sections 23 and 24, each with respect to the other.

The housing extension 21 is secured to the motor housing 20 by means of spaced bolts 30 (only one of which is shown) extending through said housing extension 21, to suitable threaded holes in the motor housing 20. The housing extension 21 is provided with spaced external lugs 31 each of which has a threaded bore adapted to receive the threaded ends of adjusting bolts 32. The adjusting bolts 32 extend through notched portions of lugs 33 and 34 on the outside of the front and back sections 23 and 24, and each adjusting bolt 32 has a handle 35 adapted to bear against the corresponding notched lug 33 on the front section 23 so as to hold the latter in place against the back section 24 to form the impeller casing 22.

The motor shaft 36 has a quill 37 adapted to slip over the end of the shaft 36 and to be secured thereto by means of a taper pin 38. The quill 37 has an extension 39 which has a flat portion 40, the impeller hub 41 having a bore of similar cross section to fit onto the quill extension 39 and to be held in position thereon by a nut 42 secured to the threaded end of the quill extension 39.

In order to provide a liquid seal at the motor side of the impeller casing 22, a sealing shell 43 fits over a portion of the quill 37 and has an O-ring 44 between the quill 37 and the sealing shell 43. A helical spring 45 surrounds the sealing shell 43 and bears at one end against a shoulder 46 on the quill 37 and at the other end on a peripheral rim 47 on the sealing shell 43 so as to cause the latter to bear against a carbon sealing disc 48 which in turn bears in sealing relation against the seat element 49 in the back section 24.

The impeller 25 is preferably a diametrical perforate blade, the preferred form of perforations being a plurality of circular holes 50 drilled in the blade. Thus when the casing 22 contains a quantity of cream for example, and the impeller blade 25 may be operated at a speed of approximately 3450 R. P. M., it has a violent agitating effect upon the cream and tends to destabilize some of the fat globule structure of the cream. The speed of rotation is not critical and may be at a rate of 1725 R. P. M. for example.

The rear wall of the casing 22 is provided with a volute channel 51 leading to an outlet 52. When in operation, the destabilizing impeller blade 25 tends to impart a rotary motion to the liquid in the casing and a flow is created in the volute channel 51 out through the outlet 52. Thus, in addition to its destabilizing function, the destabilizing unit 10 has something of a pumping action on the cream passing through the unit.

Referring now to the air inlet valve, it comprises a T-member 53 as shown in Fig. 5, with an air inlet extension 54 having an internal valve seat 55 and a valve 56 adapted normally to be seated thereon. The valve stem 57 projects outwardly through the air inlet extension 54 and is threaded at its outer end to receive an adjusting nut 58, a helical spring 59 being interposed between the adjusting nut 58 and the exterior of the air inlet extension 54. Thus by adjusting the nut 58 on the valve stem 57, a greater or lesser degree of compression may be exerted on the spring 59 so as to regulate the amount of pressure on the valve 56. Air inlet openings 60 are provided in the air inlet extension 54 beyond the valve 56 so that air is admitted through the valve 56 when it is unseated by sufficient reduction of air pressure within the air inlet valve 13.

Notwithstanding the liquid flow from the pump 12, the accelerated flow created by the destabilizing unit 10 tends to draw air through air inlet valve 13 with sufficient velocity to create a reduced pressure within the air inlet extension 54 and thus to cause the valve 56 to open and admit air to be intermingled with the liquid.

It is desirable to include some air with the cream supplied to the destabilizing unit 10 because the presence of some air has been found to facilitate destabilization of the cream. The proportion of air required for optimum destabilization may depend upon the age of the cream and other factors. Thus it is important that the air inlet valve 13 be adjustable so as to control the amount of air introduced into the cream in accordance with the requirements for the particular cream being processed.

Downstream from the destabilizing unit 10, a control valve 16 is provided as shown in Fig. 4 of the accompanying drawing. The control valve 16 has a T-body 61 with an inlet 62 at one side and an outlet 63 at right angles thereto. Opposite to the outlet 63 and aligned therewith is a control needle 64 mounted in a plug 65. The control needle 64 is externally threaded as shown at 66 for screw engagement with a corresponding internally threaded bore in the plug 65. A cap 67 is mounted with the plug 64 and connected to the T-body 61 by means of a hex nut 68 which is threadably engaged to said T-body 61 as shown.

The plug 65 is relatively tubular with a portion 69 remote from the threaded bore thereof encircling the shank of the control needle 64. The cap 67 has a similar shank encircling portion 70 spaced sufficiently from the corresponding portion 69 of the plug 65 to receive an O-ring 71 therebetween. The O-ring 71 is compressed by the interior of the cap 67 against the shank of the control needle 64 to provide a liquid-tight seal.

The control needle 64 has a conical valve 72 projecting toward the outlet 63 which valve 72 culminates in a rounded projection 73. A valve seat 74 corresponding to the conical shape of the valve 72 is contained in a plug 75 inserted in the outlet 63 and has a flared skirt portion 76 which is engaged between the T-body 61 and an outlet duct 77, the assembly being held together by a hex nut 78 engaging a ferrule 79 on the outlet duct 77 and being threadably secured to the outlet 63.

The conical seat 74 in the plug 75 communicates with a transverse passage 80 substantially diametrically disposed with respect to the outlet duct 77 and adapted to discharge laterally therein. The rounded projection 73 on the conical valve 72 is preferably of sufficient length that when the said conical valve is almost closed, the rounded projection 73 will bear on the opposite wall of the transverse passage 80, thus preventing complete closing of the conical valve 72. At its opposite end, the control needle 64 has a handle 81 to facilitate turning and screw adjusting of the conical valve 72.

For convenience in adjusting the control valve 16 to the desired setting, the plug 65 may be provided with a tubular enclosure 82 for the control needle 64 and may be calibrated such as by the provision of spaced holes 83. The handle 81 may be provided with a sleeve 84 telescopically engaged with the tubular enclosure 83 so that when the handle 81 is unscrewed to retract the conical valve 72 from the valve seat 74, the sleeve 84 retracts with respect to the tubular enclosure 82. The position of the sleeve 84 with respect to the calibration holes 83 or other markings thus serves to indicate the position of the conical valve 72 with respect to the valve seat 74.

The function of this control valve is to regulate the hold back pressure on cream discharged by the destabilizing unit 10. It is important to retard the flow of cream through the destabilizing unit 10 to insure complete destabilization of the cream. The degree of retardation necessary depends on various factors such as the age and condition of the cream. Thus for some creams, complete destabilization is achieved with a minimum of hold-back on the cream, whereas others require considerable retardation.

In order to check on the degree of destabilization of the cream flowing through the destabilizing unit 10, a sampling valve 85 is connected with the outlet duct 77 by means of a T-fitting 86 as shown in Fig. 1. Thus an operator may set the system in operation and check the condition of the cream processed thereby by taking samples at the sampling valve 85. If the destabilization is incomplete, it may be desirable to admit more air by opening the air inlet valve 13, or it may be desirable to reduce the valve opening in the control valve 16. Conversely, if the cream has the appearance of being over-destabilized, the control valve 16 may be opened partially, or the air inlet valve 13 may be closed partially.

The components of this system are preferably made of stainless steel, at least all of the product contact surfaces should be made of this material for sanitary reasons. Likewise it will be noted that the components are designed for convenient disassembly so as to permit frequent taking apart for cleaning.

In operation, the cream vat 11 is preferably filled with cream for the making of butter such as cream with from 30 to 40 percent milk fat content. The destabilizing unit 10, the heater 17, and the separator 18 are then placed in operation to be ready to process the cream supplied to them. Finally the pump 12 is placed in operation to supply cream to the system. It is important to sample the cream coming through at the sampling valve 85 and to adjust both the air inlet valve 13 and the control valve 16 to obtain complete destabilization without excessive destabilization.

It will be understood from the foregoing description of our destabilizing facilities and the operation thereof that our method of destabilization involves vigorous agitation of cream or the like in the presence of a controlled proportion of air. Our method includes retardation of the flow of the agitated cream so as to control the amount of agitation to which the cream is subjected and thus to permit regulation of the degree of destabilization.

While we have shown and described our invention in a preferred form, we are aware that various modifications can be made in the components to serve the same purpose such as by the substitution of equivalents and the like, and such modifications can be made without departing from the spirit of our invention, the scope of which is to be determined by the appended claim.

We claim:

In a system of the class described, the combination of a liquid supply duct with an air inlet valve therein, a liquid discharge duct with a liquid retarder therein, and a liquid agitation unit interposed between and connected with said ducts, said agitation unit comprising a casing with a chamber therein and a perforate impeller blade rotatably mounted therein, said air inlet valve being held resiliently in closed position and adapted to be opened by reduction of pressure within said liquid supply duct, said liquid retarder comprising a valve member interposed in said discharge duct, said valve member having a relatively conical valve seat at its upstream side, a tapered valve pin adjustable with respect thereto, and a lateral port at the downstream side thereof.

References Cited in the file of this patent

UNITED STATES PATENTS

| | | |
|---|---|---|
| 1,460,982 | Records | July 3, 1923 |
| 1,760,374 | Pepper | May 27, 1930 |
| 2,052,569 | Jensen | Sept. 1, 1936 |
| 2,350,095 | Carlson et al. | May 30, 1944 |
| 2,591,441 | Kollsman | Apr. 1, 1952 |
| 2,633,170 | Balmain | Mar. 31, 1953 |
| 2,648,606 | Lloyd | Aug. 11, 1953 |
| 2,652,234 | Feldman | Sept. 15, 1953 |